Figure 1:
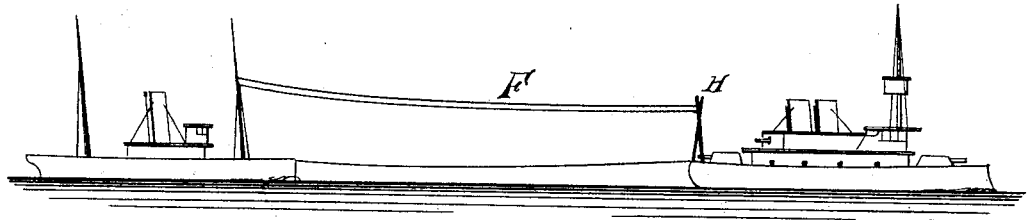

No. 709,916. Patented Sept. 30, 1902.
H. W. LEONARD.
METHOD OF CONTROLLING ELECTRIC MOTORS.
(Application filed Dec. 10, 1901.)
(No Model.)

WITNESSES:

INVENTOR
Harry Ward Leonard
BY
ATTORNEY.

UNITED STATES PATENT OFFICE.

HARRY WARD LEONARD, OF BRONXVILLE, NEW YORK.

METHOD OF CONTROLLING ELECTRIC MOTORS.

SPECIFICATION forming part of Letters Patent No. 709,916, dated September 30, 1902.

Original application filed August 26, 1901, Serial No. 73,242. Divided and this application filed December 10, 1901. Serial No. 85,360. (No model.)

*To all whom it may concern:*

Be it known that I, HARRY WARD LEONARD, a citizen of the United States, residing at Bronxville, in the county of Westchester and State of New York, have invented a certain new and useful Improvement in Methods of Controlling Electric Motors, of which the following is a specification.

The object of my invention is to provide a system for controlling the torque and speed of electric motors employed in power systems; and my invention has especial reference to the operation by electric power of cable, chain, belt, or similar conveying apparatus employed for hauling coal, freight, &c., in such a manner that the speed and tension of the cable or similar device can be varied and in some cases reversed in direction of movement under the control of an operator.

As a typical instance of the application of my invention I will describe it as applied to the coaling of war-ships or other vessels at sea.

In carrying my invention into effect I employ two dynamo-electric machines, the armatures of which are connected in a local loop and the armature-terminals of the local source are connected to the loop, so that the armatures of the dynamo-electric machines will be in multiple-arc relation to the local source. The local source is preferably a dynamo-electric machine, which may be driven by an electric motor or other form of prime mover. The fields of the three dynamo-electric machines have windings which are separately excited. In the preferred arrangement employed by me one of the dynamo-electric machines connected with the work or load operates as a generator and the other operates as a motor. When my invention is applied to the driving of a cable or similar device, I provide two drums, one for each of the first-named dynamo-electric machines. These drums are driven in such direction that as one drum pays out the cable the other drum takes it up. When employed for coaling at sea, the cable from the two drums may be carried over sheaves at the masthead of the collier and around one or more sheaves on the towing vessel which is to receive the coal, such sheaves being suitably elevated, as by means of shear-poles.

In coaling at sea it is important to preserve upon the cable or equivalent device which connects the collier with the receiving vessel an approximately constant tension regardless of the relative motion of the two ships. Heretofore in attempts at coaling vessels at sea by means of cable for hauling the coal in bags a cable extended from the collier to the receiving vessel and then back again to the collier, the bags containing the coal being attached directly to the cable or to a trolley moved by the cable. In these instances the cable was first moved in one direction to convey the full bags of coal to the receiving-ship and then the cable was caused to travel in the opposite direction in order to return the empty bags to the collier. In some of these attempts three cable-lines were employed in addition to the two lines, the upper line being what is known as the "sea-anchor" line, the other two cable-lines being the conveying-cable. In all cases it is important to maintain the hauling-cable at a proper tension, and at the same time the driving apparatus must be capable of operating the cable in either direction and at any desired speed within limits. By means of my arrangement of driving-machines I not only accomplish this object, but the variation in tension on the cable due to the rolling or pitching of the vessels is automatically compensated for by the peculiar arrangement of the driving-machines—that is to say, the machines are adjusted in the first instance to operate at a given torque and speed. When the tension of the cable varies, the load on the drums will vary correspondingly, resulting in a corresponding variation of the counter electromotive forces of the machines connected in the local loop-circuit, with the result that the machine operating as a motor will automatically take a greater or lesser amount of energy, producing a corresponding variation in torque and speed, while the machine driven as a generator by the moving cable will produce a greater or lesser amount of energy, according to the speed of the cable, and thus the drums will take up and pay out the cable faster or slower, according to the variation in tension produced by the rolling or pitching of the vessels.

In the accompanying drawings, forming a part hereof, I have illustrated the application of my invention to the coaling of ships at sea.

Figure 2:
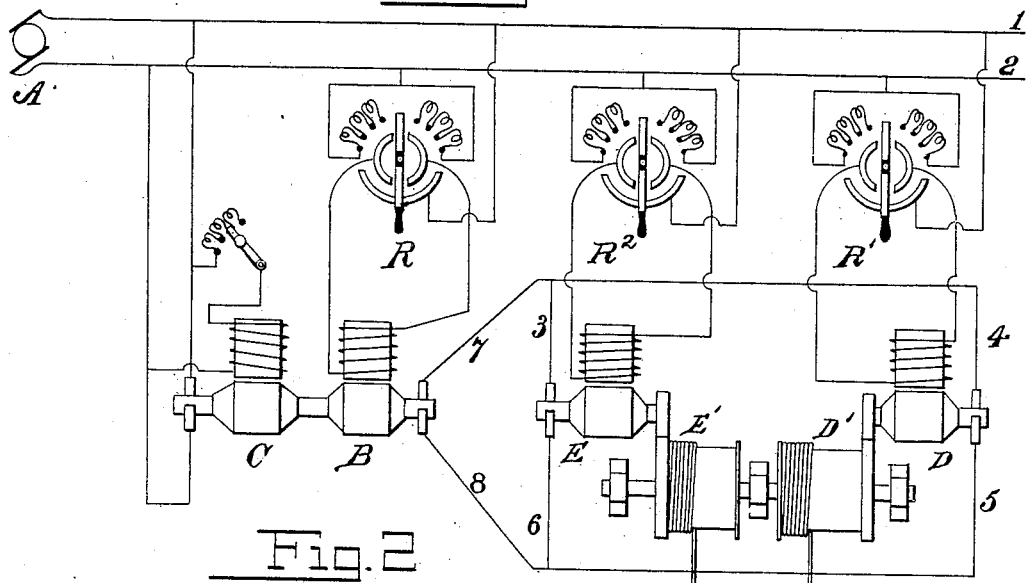
Figure 3:
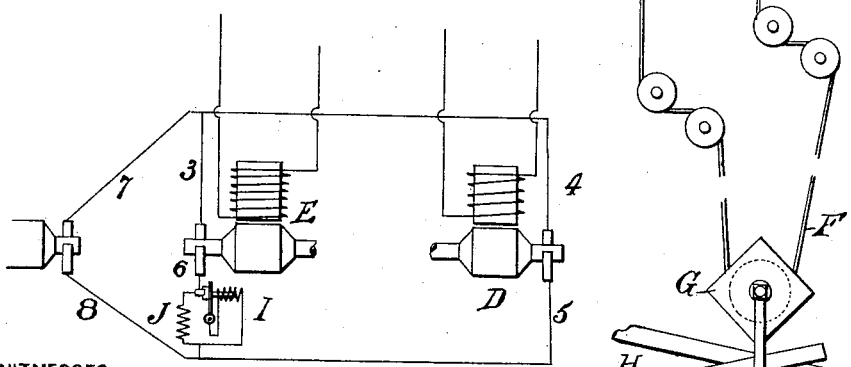

Figure 1 is a conventional illustration of a ship towing a collier and having a hauling-cable extending from sheaves at the forward masthead of the collier to a suitable sheave on shear-poles erected on the towing vessel. Fig. 2 is a diagram illustrating the arrangement of the main and local sources of energy, the driving-machines, cable-drums, &c., and the circuit connections. Fig. 3 shows a modification of the local closed loop in which the armatures of the driving dynamo-electric machines are connected.

Referring to Fig. 2 of the drawings, A is a source of practically constant electromotive force—such, for example, as a dynamo-electric machine, from which extends the circuit 1 2 for supplying current to lamps, motors, or other translating devices.

B is a dynamo-electric machine driven as a generator by electric motor C or by any other form of prime mover, such as a steam-engine or gas-engine. The field of dynamo B is partially or wholly separately excited, and, as shown in the diagram, the field-winding is connected across the circuit 1 2, preferably through reversing-rheostat R.

D and E are dynamo-electric machines geared or otherwise connected to cable-drums D' and E', respectively, one of said machines operating as a motor and the other as a generator—i. e., the armature geared to the take-up drum acts as a motor-armature and the other acts as a generator-armature. The field-windings of machines D and E are connected in multiple-arc relation across circuit 1 2 through reversing-rheostats R' and R², respectively, although in some instances they may have additional windings and in many instances the reversing-rheostats R' and R² may be omitted. The armatures of machines D and E are connected in a closed loop, (indicated by the circuit connections 3 4 5 6,) and which loop is connected across the armature-terminals 7 8 of machine B, so that the armatures of machines D and E will be in multiple-arc relation across circuit 7 8.

If the fields of machines D and E are continually excited and machine B is continually driven, it will be evident that an operator by manipulating the field-reversing rheostat R can produce at the armature-terminals of machines D and E any desired electromotive force within limits and that the electromotive force can be varied and reversed at will. It will also be evident that by properly exciting the fields of machines D and E the speed of the two armatures can be made equal at all times and that therefore the cable can be paid out from drum E' at the same speed that it is taken up by the drum D', or vice versa.

It will also be evident that if the field of one machine is slightly weakened the counter electromotive force of that machine will be reduced below that of the other machine if the speed of the two armatures are held relatively the same by the cable connecting them.

Let it be supposed that machine D is driving drum D' so as to take up the cable, the field of that machine being weakened. That machine will tend to run faster in its weakened field and in so doing must drive E faster, thus raising its electromotive force and making it a generator. The result will be that a current will circulate in the local loop 3 4 5 6, this local current being due to the difference in the electromotive forces of the machines D and E. In order to simplify the study of the results, let it be supposed that the distance between the receiving vessel and the collier, or, in other words, between the drums D' and E' and sheave G on the shear-poles H, is constant and that machine D is operating as a motor driving drum D' so as to take up the cable. The pull thus given to the cable will tend to drive machine E through the unwinding of the cable from drum E'. Disregarding all losses due to friction and heat in the electrical apparatus, it will be evident that the fields of machines D and E can be so adjusted that machine E will be driven at such a speed by the cable that its electromotive force will be exactly equal to the electromotive force supplied by machine B. In that case there will be no current in path 3 6 and current will flow from machine B through path 7 4 5 8. If now the field of D is further weakened, the armature of machine D will tend to speed up and in so doing must drive drum E' and armature of machine E faster, causing machine E to operate as a generator, which will cause a current to flow in the local loop 3 4 5 6. Machine B will continue to supply another current in the circuit 7 4 5 8, and the two currents will be joined in parallel in the armature of machine D. As above stated, the current in the local loop will be due to the difference between the electromotive forces of machines D and E, and this current can be controlled by the manipulation of rheostats R' and R². If desired, these rheostats may be varied inversely.

The current in the local loop will produce a tension upon the cable, and since the current in this loop can be controlled the tension of the cable can likewise be controlled. The speed of the cable can be controlled by controlling the electromotive force of machine B or by simultaneously and similarly varying the fields of machines D and E. To reverse the direction of motion of the cable, the electromotive force of machine B may be reversed by the reversing field-rheostat R or by reducing the electromotive force of that machine practically to zero and then simultaneously reversing the armature connections of machines D and E, or the field connections of those machines may be reversed.

If while the cable is in operation with a certain tension upon it the vessels should lurch toward each other, so that the distance between them and the tension of the cable is suddenly reduced, machine D under those conditions will immediately increase its speed and take up the slack in the cable. If the distance between the vessels were to suddenly increase, due to the rolling or pitching, the current in the local loop will instantly increase, due to the increased speed of the cable. Thus it will be seen that the slack in the cable can be maintained practically uniform regardless of the relative movement of the two objects.

If desired, I may wind the field-coils of either or both machines E and D so that they will have some series turns which are normally accumulative to the separately-excited turns, as this makes them act with flexibility over a wider range at any speed, as will be understood by those skilled in the art.

To protect machines D and E against an excessive current, I may connect an automatic circuit-breaker in the local loop—for example, in the circuit 3 6, as shown in Fig. 3. In that illustration, I represents an automatic overload circuit-breaker shunted by a resistance J. If the current in the local loop becomes excessive, the switch will automatically open and will insert the resistance in the local loop 3 4 5 6.

In practice rheostats R, R', and R² will be located in close proximity, so as to be within reach of one operator, and these rheostats are preferably located near machines D and E, so that the operator will be in position to observe and control the operation of the entire apparatus. When it is desired to shift the rheostats R' and R² uniformly to control those machines, the resistance and contacts will be arranged in juxtaposition, so that the two contact-arms may be moved by one operating-handle, and when it is desired to vary the fields inversely the field-coil connections with the resistance will be made, so that as resistance is inserted in the field of one machine resistance will be cut out of the field of the other machine. Instead of arranging the rheostats as above stated the contact-arms may be connected by suitable gearing, so as to move uniformly and with the same or opposite effect, or the contact-arms may be geared so as to move at different speeds, according to the conditions of operation.

While the controlling-rheostats are preferably located on the vessel provided with the machines for driving the conveying apparatus, it will be evident that the controllers may be located on the other vessel and connected therewith by an electrical conducting-cable. It will be also evident that a set of controllers may be provided on each vessel. It will also be understood that my invention may be applied to cable conveyers on land or for controlling any other conveyer system or for operating any form of vehicle or apparatus wherein it is desirable to control the tension of a cable or equivalent device.

I do not claim herein the system of motor control above described, and shown in the drawings, nor the apparatus or its equivalent employed in my improved method of controlling electric motors, or in the method of conveying materials between two objects, or between moving vessels, or between a stationary object and a vessel free to move on the surface of the water, since those features of my invention are claimed in my application filed August 26, 1901, Serial No. 73,242, of which this application is a division.

What I claim is—

1. The method of varying the tension of a moving cable, consisting in causing said cable to drive a generator of electric energy and varying the energy so produced.

2. The method of controlling the tension upon a cable or equivalent device connecting two objects, consisting in mechanically connecting the cable with the revolving element of a dynamo-electric machine and varying the current in one element of said dynamo-electric machine whereby the tension upon said cable is controlled.

3. The method of controlling the tension upon a moving cable or equivalent device connecting two objects, which consists in causing the moving cable to generate electric energy and controlling the amount of electric energy generated.

4. The method of controlling the tension upon a cableway between two ships at sea, which consists in winding up one end of the cable by means of an electric motor, driving by means of the other end of the cable an electric generator, and controlling the output of said generator.

5. The method of operating a cableway between two ships at sea, which consists in stretching between the ships a cable, the two ends of which are upon one ship and the bight of which is upon the other ship, winding up one end of the cable by means of an electric motor, driving an electric generator by means of the other end of the cable in order to produce motion of the conveying-cable in one direction, and reversing the direction of motion of the cable by reversing the necessary elements of said dynamo-electric machines.

This specification signed and witnessed this 6th day of December, 1901.

H. WARD LEONARD.

Witnesses:
HARRY F. DAVIDSON,
J. L. KEBLER.